(12) United States Patent
Steiner et al.

(10) Patent No.: US 9,483,751 B2
(45) Date of Patent: Nov. 1, 2016

(54) LABEL PRIVILEGES

(75) Inventors: Matthew S. Steiner, Mountain View, CA (US); Henry T. Benjamin, Sherman Oaks, CA (US)

(73) Assignee: Google Inc., Mountain View, CA (US)

(*) Notice: Subject to any disclaimer, the term of this patent is extended or adjusted under 35 U.S.C. 154(b) by 682 days.

(21) Appl. No.: 13/171,098

(22) Filed: Jun. 28, 2011

(65) Prior Publication Data
US 2012/0216257 A1    Aug. 23, 2012

Related U.S. Application Data

(60) Provisional application No. 61/444,434, filed on Feb. 18, 2011.

(51) Int. Cl.
H04L 29/00 (2006.01)
G06Q 10/10 (2012.01)
G06Q 50/00 (2012.01)

(52) U.S. Cl.
CPC .............. *G06Q 10/10* (2013.01); *G06Q 50/01* (2013.01)

(58) Field of Classification Search
CPC ...................................... G06F 21/00
USPC ........................................... 726/4
See application file for complete search history.

(56) References Cited

U.S. PATENT DOCUMENTS

| | | |
|---|---|---|
| 6,606,398 B2 | 8/2003 | Cooper |
| 7,783,980 B1 | 8/2010 | Herold |
| 7,945,653 B2 | 5/2011 | Zuckerberg et al. |
| 8,151,358 B1* | 4/2012 | Herold ........................... 726/27 |
| 8,346,898 B2* | 1/2013 | Marcus et al. ................ 709/220 |
| 8,392,957 B2* | 3/2013 | Holt et al. .................... 725/105 |
| 8,676,909 B2* | 3/2014 | Guyot et al. .................. 709/206 |

(Continued)

FOREIGN PATENT DOCUMENTS

| | | |
|---|---|---|
| CN | 101533520 A | 9/2009 |
| CN | 101771677 A | 7/2010 |

(Continued)

OTHER PUBLICATIONS

Carthy, Face.com Brings Facial Recognition to Facebook Photos (We have Invites) [online] Mar. 24, 2009 [Retrieved on Mar. 15, 2012]. Retrieved from the Internet <URL: http://techcrunch.com/2009/03/24/facecom-brings-facial-recognition-to-facebook-photos-we-have-invites>.

(Continued)

*Primary Examiner* — Michael D Anderson
(74) *Attorney, Agent, or Firm* — IP Spring

(57) ABSTRACT

Methods, systems, and apparatus for managing labeling privileges. In one aspect, a method includes receiving label data defining a label to be associated with an image of a first user in a photograph, the first user identified by a first user identifier and the label data associated with a submitting user identifier; accessing data defining labeling privileges for the first user identifier, the labeling privileges being for second users identified by respective second user identifiers, and the labeling privileges defining, for each second user, a labeling privilege for the second user to label an image of the first user in a photograph; determining whether the submitting user identifier is included in the second user identifiers; in response to determining that the submitting user identifier is included in the second user identifiers: determining the labeling privileges for the user identified by the submitting user identifier, and processing the label accordingly.

21 Claims, 7 Drawing Sheets

(56) References Cited

U.S. PATENT DOCUMENTS

| | | | |
|---|---|---|---|
| 2005/0197846 | A1 | 9/2005 | Pezaris et al. |
| 2008/0040475 | A1 | 2/2008 | Bosworth et al. |
| 2008/0040673 | A1 | 2/2008 | Zuckerberg et al. |
| 2008/0077595 | A1 | 3/2008 | Leebow |
| 2008/0141136 | A1* | 6/2008 | Ozzie et al. .......... 715/723 |
| 2008/0189336 | A1 | 8/2008 | Prihodko |
| 2008/0270425 | A1 | 10/2008 | Cotgreave |
| 2009/0070334 | A1 | 3/2009 | Callahan |
| 2009/0328135 | A1 | 12/2009 | Szabo |
| 2010/0050090 | A1 | 2/2010 | Leebow |
| 2010/0277611 | A1 | 11/2010 | Holt |
| 2011/0038512 | A1 | 2/2011 | Petrou et al. |
| 2011/0044512 | A1* | 2/2011 | Bambha et al. .......... 382/118 |
| 2011/0085710 | A1 | 4/2011 | Perlmutter et al. |
| 2011/0173705 | A1* | 7/2011 | Sundaram et al. .......... 726/28 |
| 2011/0182485 | A1 | 7/2011 | Shochat et al. |

FOREIGN PATENT DOCUMENTS

| | | |
|---|---|---|
| JP | 2007334696 A | 12/2007 |
| JP | 2011504260 A | 2/2011 |
| JP | 2011257853 A | 12/2011 |
| WO | 2010024991 A2 | 3/2010 |
| WO | 2010149312 | 12/2010 |

OTHER PUBLICATIONS

Knies, Computers Working on Your Behalf, Microsoft Research [online] Mar. 3, 2010 [Retrieved on Mar. 15, 2015]. Retrieved from the Internet: <URL: http://research.microsoft.com/en-us/news/features/030310-behalf.aspx>.

Chellappa and Zhou, Face Tracking and Recognition from Video* in Handbook of Face Recognition (Chapter 8) (2nd Edition), Li & Jain (Eds), [online] 2011 [Retrieved on Mar. 15, 2015]. Retrieved from the Internet <URL: http://www.cs.hmc.edu/research/robotics/Handbook_of_Face_Recognition/chapter0.pdf>.

Face.com Brings Facial Recognition to Facebook Photos (We have Invites). ITI Technology Observatory—Noticias y opinión: Face.com Brings Facial Recognition T . . . [online] Mar. 15, 2012 [Retrieved on Mar. 15, 2012]. Retrieved from the Internet <URL: https://observatorio.iti.upv.es/resources/new/3686>.

Wiskott et al., Face Recognition by Elastic Bunch Graphic Matching*\ in Intelligent Biometric Techniques in Fingerprint and Face Recognition, eds. Jain et al. CRC Press, Chapter 11, pp. 355-396, 1999.

Face.com Developers, Documentation :: User IDs & Namespaces [online] copyright 2010 [Retrieved on Mar. 15, 2012]. Retrieved from the Internet: <http://developers.face.com/docs/users/>.

International Preliminary Report on Patentability and Written Opinion, dated Aug. 21, 2013, for related PCT Application No. PCT/US2012/025461.

IP Australia Melbourne Patent Examination Centre, ; Patent Examination Report 1 AU 2012217568; dated Nov. 7, 2014; 3 pages.

European Patent Office; Extended European Search Report EP application 12707429.2 (PCT/US2012/025461); dated Feb. 24, 2015; 8 pages.

IP Australia, Notice of Acceptance for related Australian Patent Application No. 2012217568, Dec. 9, 2015, 2 pages.

SIPO, First Office Action for Chinese Patent Application No. 201280017974.X, Dec. 28, 2015, 26 pages.

Japanese Patent Office, Notice of Allowance for Japanese Patent Application No. 2013-554609, Feb. 1, 2016, 3 pages.

Japanese Patent Office. Japanese Office Action received for Japanese Application No. 2013-554609 (translation). Sep. 29, 2015. 7 pages.

SIPO, Second Office Action (with English translation) for Chinese Patent Application No. 201280017974.X, Aug. 18, 2016, 8 pages.

* cited by examiner

LABEL PRIVILEGES

CLAIM OF PRIORITY

This application claims priority under 35 USC §119(e) to U.S. Patent Application Ser. No. 61/444,434, filed on Feb. 18, 2011, the entire contents of which are hereby incorporated by reference.

BACKGROUND

This specification relates to the identification and labeling of users in digital photographs hosted by social networking service.

Electronic social networks are network-based services that provide users with an ability to associate and communicate with each other. Users are able to identify other users with whom they have a social relationship (e.g., "friending" other users). Once a social relationship has been expressed, the users typically are able to see communications, status updates, and other notifications generated by their "friends" social networking activities.

Social networks also provide services that enable users to upload, store, and share digital photos. In some cases, the social networks also provide functions for users to label (e.g., "tag") themselves and other users whose images appear in photos hosted by the social network. As such, a user may view collections of photos that include himself/herself, or collections of photos of other users whom the user has permission to view.

Each user trusts some people to tag them in a photo, such as people they know. Conversely, there are other people that the user does not trust to label them in a photo, e.g., people the user does not know or people the user may have just met.

SUMMARY

This specification describes technologies relating to systems and techniques for processing the association of user-identifying information with digital photographs hosted by a social networking service or otherwise associated with users by means of other social circles. An example of user-identifying information is the labeling or "tagging" photos with the names of users who appear in the photos. Users are able to select other users who are automatically allowed to label the user in photos, and to select other users who are automatically rejected from labeling the user in photos.

In general, one innovative aspect of the subject matter described in this specification can be embodied in methods that include the actions of receiving label data defining a label that is to be associated with an image of a first user in a digital photograph, the first user identified by a first user identifier and the label data received from a user device associated with a submitting user identifier; accessing data defining labeling privileges associated with the first user identifier, the labeling privileges being for second users relative to the first user, the second users identified by respective second user identifiers, and the labeling privileges defining, for each second user, a labeling privilege for the second user to label an image of the first user in a digital photograph; determining whether the submitting user identifier is included in the second user identifiers; in response to determining that the submitting user identifier is included in the second user identifiers: determining the labeling privileges defined for the user identified by the submitting user identifier, and processing the label data according to the privileges defined for the user identified by the submitting user identifier. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Social networking users are provided with greater control over who is able to identify them in digital photos. Social networking users gain greater control over their online presence and privacy. The amount of work required of social network users for approving and/or rejecting labels submitted by other users is reduced.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes systems and techniques for automatically and semi-automatically approving and rejecting the "tagging" of digital photographs in a social networking system (e.g., the associating, by one user, of a user identifier of another user with a digital image). A user can classify other users in his or her social circles into groups. The group classifications include users whose labels are automatically accepted, users whose labels are automatically rejected, and users whose labels are held for manual review. For example, a user may wish to always allow himself to be identified through labels created by his or her spouse, parent, or other trusted persons. In another example, the user may wish to always prevent himself from being identified though labels created by his or her acquaintances from his or her work environment. By establishing such privileges, the user can exercise control, or "ownership" of his or her face labels.

As used in this specification, social circles are based on categories of relationships of a user to other users. In some examples, the relationship can be implicit or explicit. For example, a user can assign their social networking contacts and better control the distribution and visibility of social networking posts.

In some implementations, as used in this specification, a social circle is provided as a data set defining a collection of contacts that are associated with one another in a computer-implemented social networking service. As used in this specification, generally a social circle can be described from the perspective of an individual that is the center of a particular collection of socially interconnected people, or from the aggregate perspective of a collection of socially interconnected people. In some examples, a social circle can have narrowly defined boundaries. For example, some social circle may have members that are familiar with one another, and permission may be required for a member to join a social circle. In some implementations, a user of the social networking service define a social circle, and the social circle, as a data set defining a collection of contacts, may reflect a real-life social circle of the user. These are examples of social circles as used in the specification. However, social circles need not be limited to these examples.

Examples of groups identified by implicit relationships are users that are implicitly identified so as to form a group that is distinct from the larger group of all users. Such implicit relationships can be based on frequent contact between the user and other users, the co-occurrence of the user and other users in photographs, users that the user photographs, and users that have photographed, to name just a few.

Figure 1:
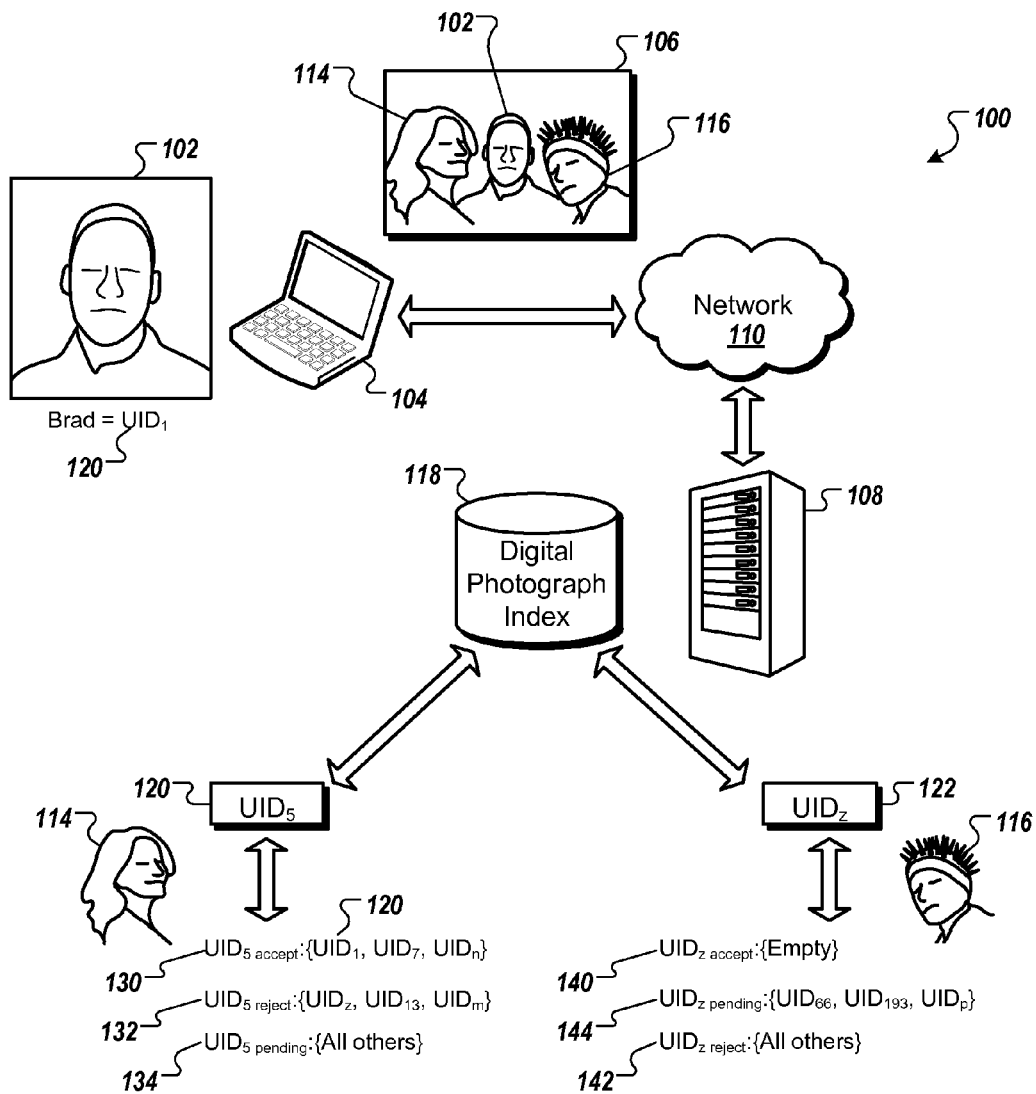
FIG. 1 is a block diagram of an example system for performing face label ownership operations.

FIG. 1 is a block diagram of an example system 100 for performing face label ownership operations. In general, users can submit digital photographs to the system 100, and users can label, or "tag" images of themselves or other users, subject to privileges set by other users. In particular, each individual user may classify other users into a group whose labels identifying the individual user are automatically accepted, a group whose labels identifying the individual user are automatically rejected, and a group whose labels identifying the individual user are left pending review by the individual user.

In the example of the system 100, a user "Brad" 102 interacts with a user device 104 (e.g., a personal computer, a cellular telephone, a pad computer, a tablet computer, a personal digital assistant, a camera configured to upload photos) to upload a digital photograph 106 to a data processing apparatus 108 through a network 110 (e.g., a wireless or wired network, such as the Internet). The digital photograph 106 includes a facial image of the user Brad 102, a facial image of a user Channing 114, and a facial image of a user Spike 116.

In some implementations, the data processing apparatus 108 can be a single server or collection of server computers performing the functions of a web server, a communications service, a social networking service, a digital photo hosting service, or other appropriate computer service that can accept the submission of digital photographs. The data processing apparatus 108 stores the digital photograph 106 in a digital photograph index 118. The digital photograph index 118 is an electronic file repository or database that can be used to store digital photographs and user identifiers for photographs submitted by users.

The user Brad is associated with a user identifier 120, labeled in the illustration as "$UID_1$". The data processing apparatus 108 thus associates the digital photograph 106 with the user Brad's identifier "$UID_1$" 120. In some implementations, the digital photograph 106 may be associated with the identifier of the user who submitted the digital photograph 106. In some implementations, the digital photograph may be associated with the identifier of the user who took the photograph (e.g., a user ID embedded as metadata in the photograph), or with the identifier of a user associated with the device that was used to take the photograph (e.g., the media access control (MAC) ID of a network camera known to be managed by a particular user).

The user Channing 114 is associated with a user identifier 122, labeled in the illustration as "$UID_5$". The user Spike 116 is associated with a user identifier 124, labeled in the illustration as "$UID_z$". The user Brad 102 labels, or "tags", himself, the user Spike 116, and the user Channing 114 In the digital photograph 106. By labeling the images of himself and other users in the digital photograph 106, the user Brad 102 associates the user identifier "$UID_1$" 120, the user identifier "$UID_5$" 122, and the user identifier "$UID_z$" 122 with the digital photograph 106.

The user Channing 114 has identified three groups of other users. An "accept" group 130 identifies other users whose labels of the user Channing 114 will be accepted automatically. For example, the user Brad's 102 user identifier "$UID_1$" 120 appears in the "accept" group 130. As such, any photographs, including the digital photograph 106 that the user Brad 102 labels as including an image of the user Channing 114 will be automatically approved. A "reject" group 132 identifies users whose labels of the user Channing 114 will be rejected automatically.

A "pending" group 134 identifies users whose labels of the user Channing 114 will be held (e.g., unavailable for other users to see) until the user Channing 114 is able to review the labels and decide which ones to approve or reject. In some implementations the data processing apparatus 108 can receive a request from a user device for the digital photograph 106, and provide, in response to the request, the digital photograph 106 and only label data that is associated with the digital photograph. For example, when another user requests to view the digital photograph 106, the data processing apparatus 108 can provide the digital photograph 106 and the "accepted" labels; any labels that have been rejected or classified as "pending" would not be provided.

In some implementations, ranges and/or wildcards can be used to define groups of users who are classified into "accept", "reject", and "pending" groups. For example, the "accept" and "reject" groups 130, 132 each include finite sets of identified users, while the "pending" group 134 includes an indication that all other users not belonging to the groups 130 or 132 should be associated with the "pending" group 134. In this example, the user Channing 114 may only trust a few other users, such as the user Brad 102, to label her unconditionally, and may only have deemed a small number of other users for automatic rejection. Since the "pending" group 134 includes the wildcard "all others", labels of the user Channing 114 that are submitted by substantially any other user in the user Channing's 114 social circles, but not included in the groups 130 or 132, will be held pending the user Channing's 114 personal approval.

The user Spike 116 has identified three groups of other users. An "accept" group 140 identifies other users whose labels of the user Spike 116 will be accepted automatically. A "reject" group 142 identifies users whose labels of the user Spike 116 will be rejected automatically. A "pending" group 144 identifies users whose labels of the user Spike 116 will be held until such time as the user Spike 116 is able to review the labels and decide which ones to approve or reject. In the illustrated example, the "accept" group 140 is empty; the user Spike 116 has not identified any other user whose labels should be approved automatically. The "pending" group 144 includes a finite number of identified other users, and the "reject" group 142 includes a wildcard that indicates that labels generated by any other users who are in the user Spike's 116 social circles but not grouped into the groups 140 or 144 should be automatically rejected. For example, the user Brad's 102 user identifier "$UID_1$" appears in neither of the groups 140 nor 144, therefore the user Brad's 102 labeling of the user Spike 116 in the digital photograph 106 will be automatically rejected.

Figure 2:
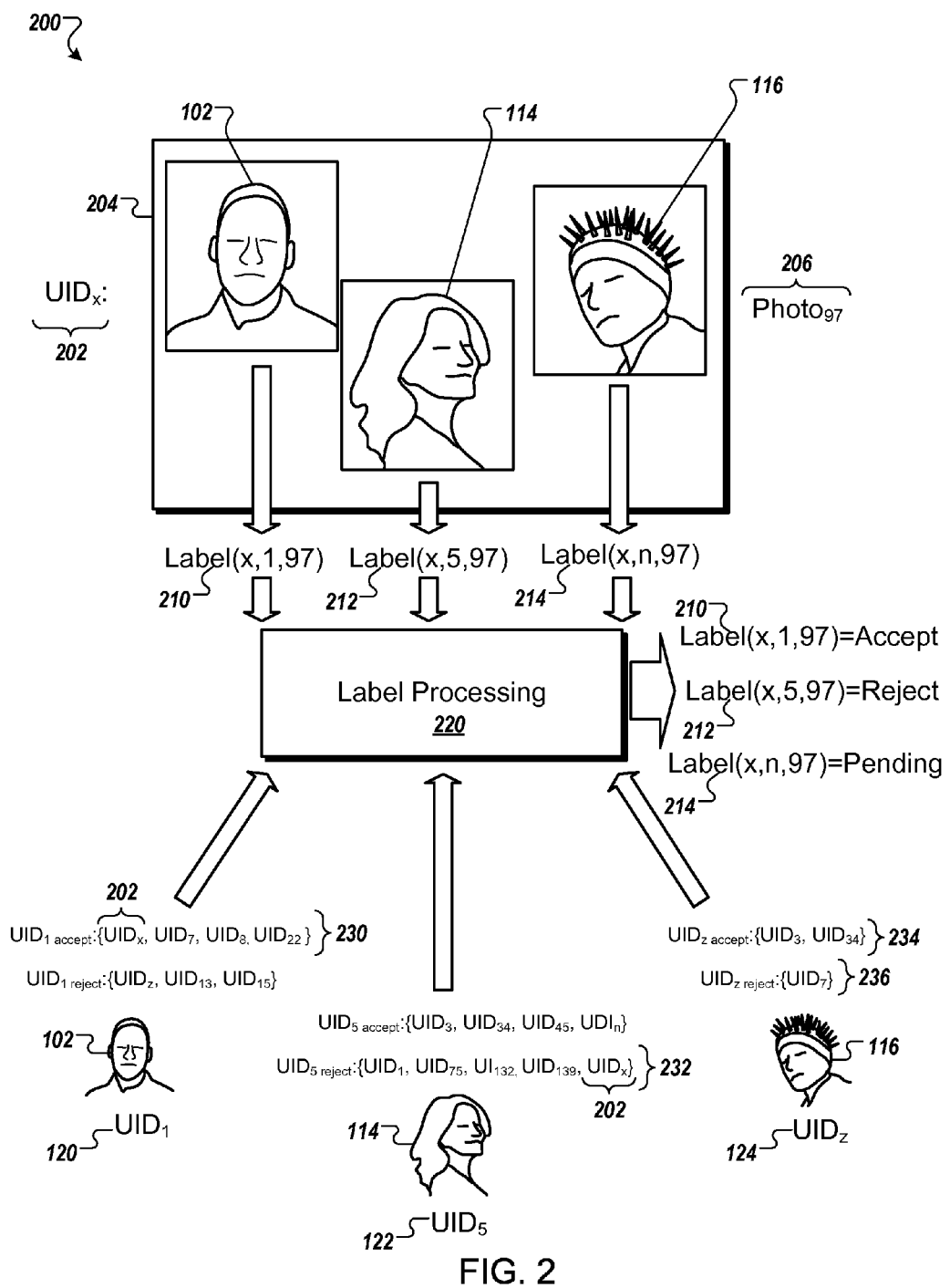
FIG. 2 is a conceptual model for performing example face label ownership operations.

FIG. 2 is a conceptual model 200 for performing example face label ownership operations. In some implementations, the operations described with respect to the model 200 may be performed by the system 100 of FIG. 1.

A submitting user "X", who is identified by an identifier "UID$_x$," 202, has performed labeling of images appearing in a digital photograph 204, which is associated with a photo identifier "Photo$_{97}$" 206. The submitting user "X" has labeled the users Brad 102, Channing 114, and Spike 116 as appearing in the digital photograph 204. A label 210, a label 212, and a label 214 are provided to a label processing module 220. The labels 210-214 include information that identifies the user who performed the labeling, the identity of the user who was labeled, and the identity of the photograph in which the labeling was done. For example, the label 210 (e.g., Label(x,1,97)) indicates that the submitting user "X" has associated the user identifier "UID$_1$" 102 with the photo identifier "97" 204.

The label processing module 220 analyzes the labels 210-214 to determine the identifiers of the users who have been labeled, and then retrieves collections of other user identifiers to determine if the labeled user has assigned the submitting user to groups for automatic acceptance, rejection, or pendency of the submitted label. In some implementations, the label processing module 220 can receive, from a user device associated with the first user identifier (e.g., the user device 104 of FIG. 1), a second user identifier and data defining label privileges for a second user identified by the second user identifier, and store the second user identifier and the data defining labeling privileges for the second user identifier in the data defining labeling privileges associated with the first user identifier.

In the example of the label 210, the label processing module 220 determines that the label 210 identifies the user Brad 102. The user Brad 102 has included the submitting user "X" 202 in an "accept" group 230. As such, the label processing module 220 automatically accepts the label 210 submitted by the submitting user "x" 202. In the example of the label 212, the label processing module 220 determines that the label 212 identifies the user Channing 114. The user Channing 114 has included the submitting user "X" 202 in a "reject" group 232. As such, the label processing module 220 automatically rejects the label 212 submitted by the submitting user "x" 202.

In the example of the label 214, the label processing module 220 determines that the label 214 identifies the user Spike 116. The user Spike 116, however, has not included the submitting user "X" 202 in an "accept" group 234 nor a "reject" group 236. In some implementations, other users may be implicitly assigned to an "accept", "reject", or "pending" group if they are not explicitly assigned by a user to any other group. For example, the user Spike 116 may have selected a user configuration option that directs the label processing module 220 to classify labels from any user not explicitly listed in the groups 234 or 236 to be treated as labels from a "pending" group. In the illustrated example, the user identifier "UID$_x$" does not appear in either the "accept" group 234 or the "reject" group 236, therefore, the label 214 is classified as "pending".

Figure 3:
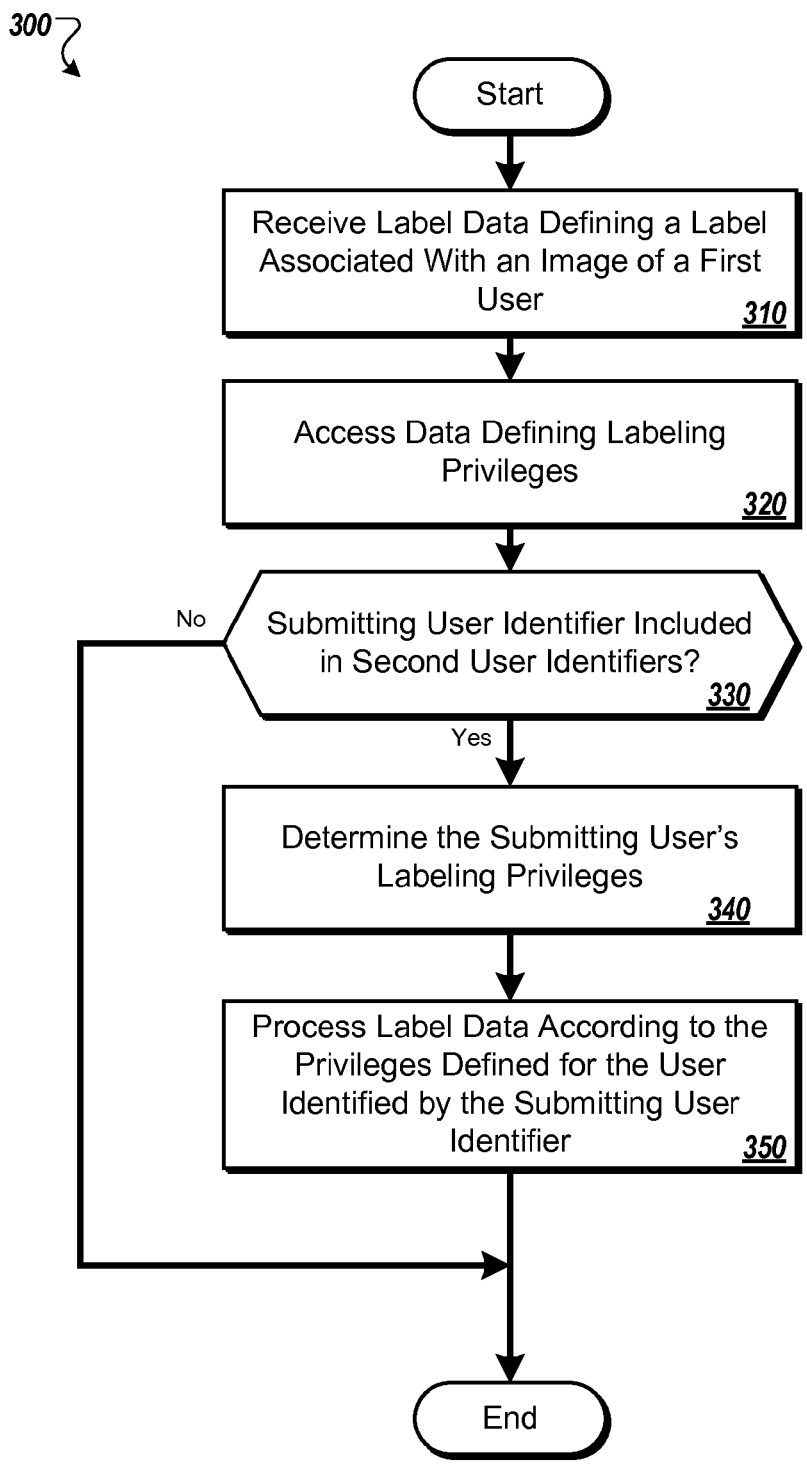
FIG. 3 is a flow diagram of an example process for performing face label ownership operations.

FIG. 3 is a flow diagram of an example process 300 for performing face label ownership operations. In some implementations, the process 300 may be performed by the data processing apparatus 108 of FIG. 1, or by the label processing module 220 of FIG. 2. The process 300 begins at step 310 when label data defining a label that is to be associated with an image of a first user in a digital photograph, in which the first user identified by a first user identifier and the label data received from a user device is associated with a submitting user identifier. For example, the submitting user "X" 202 can label the presence of the user Spike 116 in the digital photograph 204. The label 214 is associated with both the submitting user "X" 202 and the user Spike 116. The label 214 can be received by the label processing module 220.

At step 320, data defining labeling privileges associated with the first user identifier is accessed. The labeling privileges are for second users relative to the first user. The second users identified by respective second user identifiers, and the labeling privileges define, for each second user, a labeling privilege for the second user to label an image of the first user in a digital photograph. For example, the label processing module 220 can access the "accept" group 234 and the "reject" group 236 that are associated with the user Spike 116.

If at step 330, it is determined that the submitting user identifier is not included in the second user identifiers, then the process 300 ends. In some implementations, the label can be classified as pending if the submitting user identifier is not included in the second user identifiers, which is described in more detail with reference to FIG. 4.

However, if it is determined that the submitting user identifier is included in the second user identifiers, then at step 340 the labeling privileges defined for the user identified by the submitting user identifier are determined. For example, the label processing module 220 determines that the user identifier "UIDx" associated with the user "X" 202 is included in the "accept" group 230, or is included in the "reject" group 232.

At step 340, the label data is processed according to the privileges defined for the user identified by the submitting user identifier. For example, the label processing module 220 accepts the label 210, and rejects the label 212.

Figure 4:
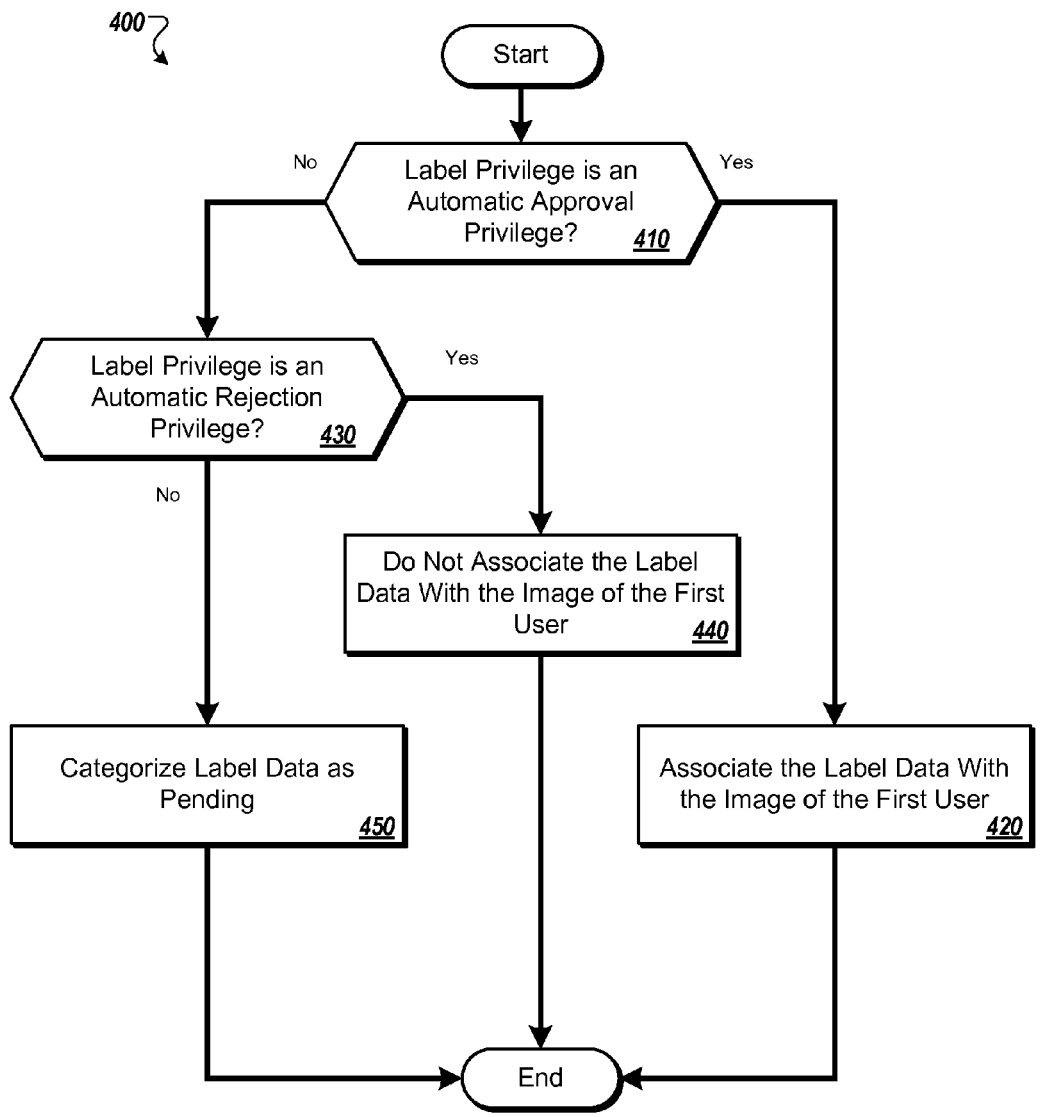
FIG. 4 is a flow diagram of an example process for associating face labels with digital images.

FIG. 4 is a flow diagram of an example process 400 for associating face labels with digital images. In some implementations, the process 400 may be performed by the data processing apparatus 108 of FIG. 1, or by the label processing module 220 of FIG. 2. In some implementations, the process 400 may be part of the step 350 of the process 300 of FIG. 3.

Labeling privileges include an automatic approval privilege and an automatic rejection privilege. For example, the user Spike 116 has defined an "accept" group 234 and a "reject" group 236 that describe the users who have automatic approval and automatic rejection privileges. The process 400 begins at step 410, in which a determination is made as to whether a labeling privilege for the submitting is an automatic approval privilege. For example, the label processing module 220 can determine that the user "X" 202 is identified in the "accept" group 230. If at step 410 the labeling privilege is an automatic approval privilege, then at step 420 the label data is associated with the image of the first user in the digital photograph. For example, the label 210 is accepted for the user Brad 102.

If at step 410 the labeling privilege is not an automatic approval privilege, then at step 430 another determination is made. If at step 430, it is determined that the label privilege defined for the user identified by the submitting user identifier is the automatic rejection privilege, then at step 440 the label data is not associated with the image of the first user. For example, the identity of the user "X" appears in the "reject" group 232, therefore the label 212 associated with the user "X" 202 and the user Channing 114 is rejected.

If, however, at step 430, it is determined that the label privilege defined for the user identified by the submitting user identifier is not the automatic rejection privilege (e.g., either explicitly defined as "reviewable" or if the submitting user identifier is not among the second user identifiers), then at step 450 the label data is categorized as pending approval. For example, the user "X" 202 appears in neither the user Spike's 116 "accept" group 234 nor the "reject" group 236, and is therefore categorized as "pending" approval by the user Spike 116.

Figure 5:
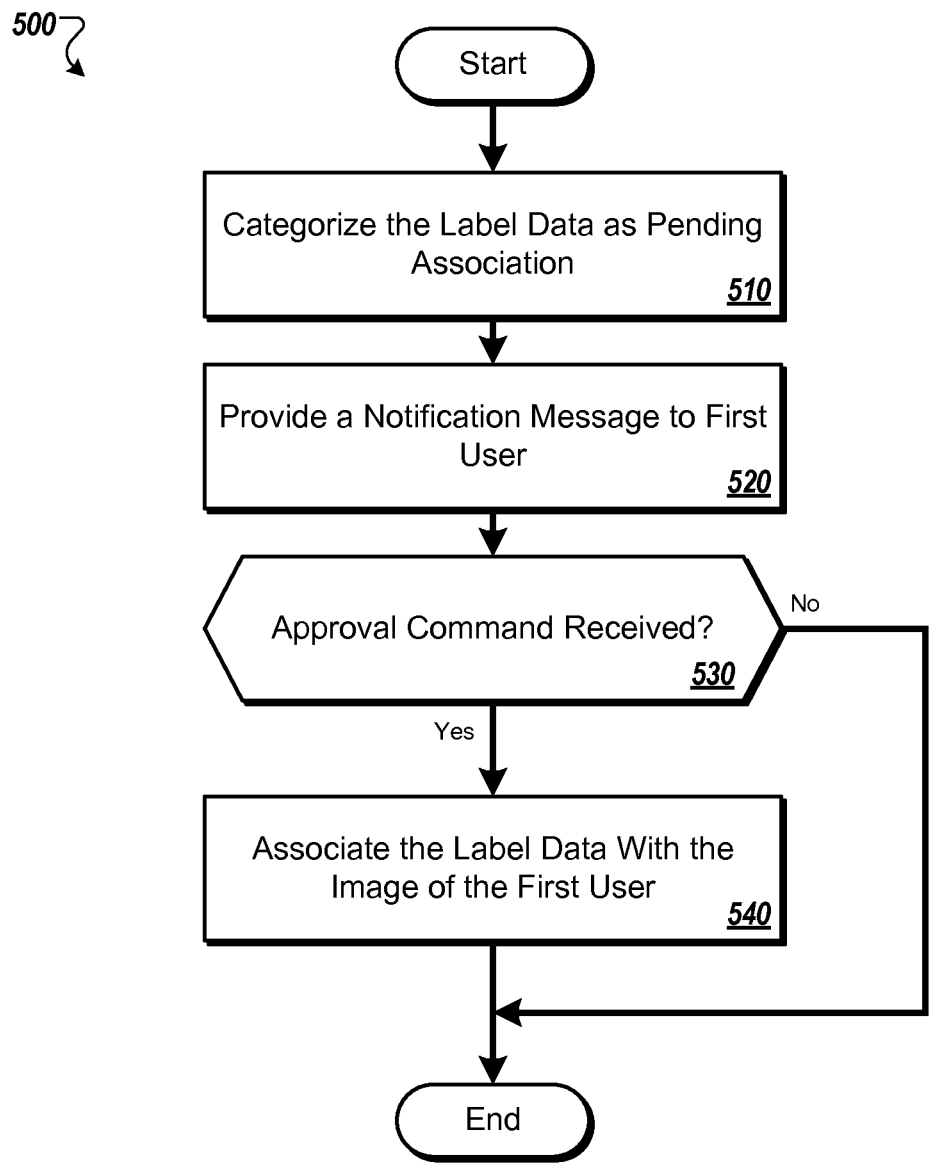
FIG. 5 is a flow diagram of an example process for handling pending face label approvals.

FIG. 5 is a flow diagram of an example process 500 for handling pending face label approvals. In some implementations, the process 500 may be performed by the data processing apparatus 108 of FIG. 1, or by the label processing module 220 of FIG. 2. In some implementations, the process 500 may be performed in response to a negative determination in step 330 of the process 300 of FIG. 3.

The process 500 begins at step 510, in which label data is categorized as pending association with the image of the first user in the digital photograph. For example, the label 214 is categorized as pending approval by the user Spike 116 for association with the photograph 204.

At step 520, a notification message addressed to an address associated with the first user identifier is provided, the notification message specifying that the label data is pending association with the image of the first user in the digital photograph. For example, the label processing module 220 may send an email, instant message, or other appropriate notification message to the user Spike 116 that the label 214 awaits his review. In some implementations, the notification message can include the digital photograph and the label data. For example, the notification message sent to the user Spike 116 may include the photograph 204 and the label 514.

If at step 530, an approval command is not received in response to the notification message, then the label data's status remains unchanged. If, however, at step 530, an approval command is received in response to the notification message, then at step 540 the label data is associated with the image of the first user in the digital photograph. For example, the user Spike 116 can review the message and approve the pending label 214, and by receiving the approval the label processing module 220 associates the label 514 with the digital photograph 204.

Figure 6:
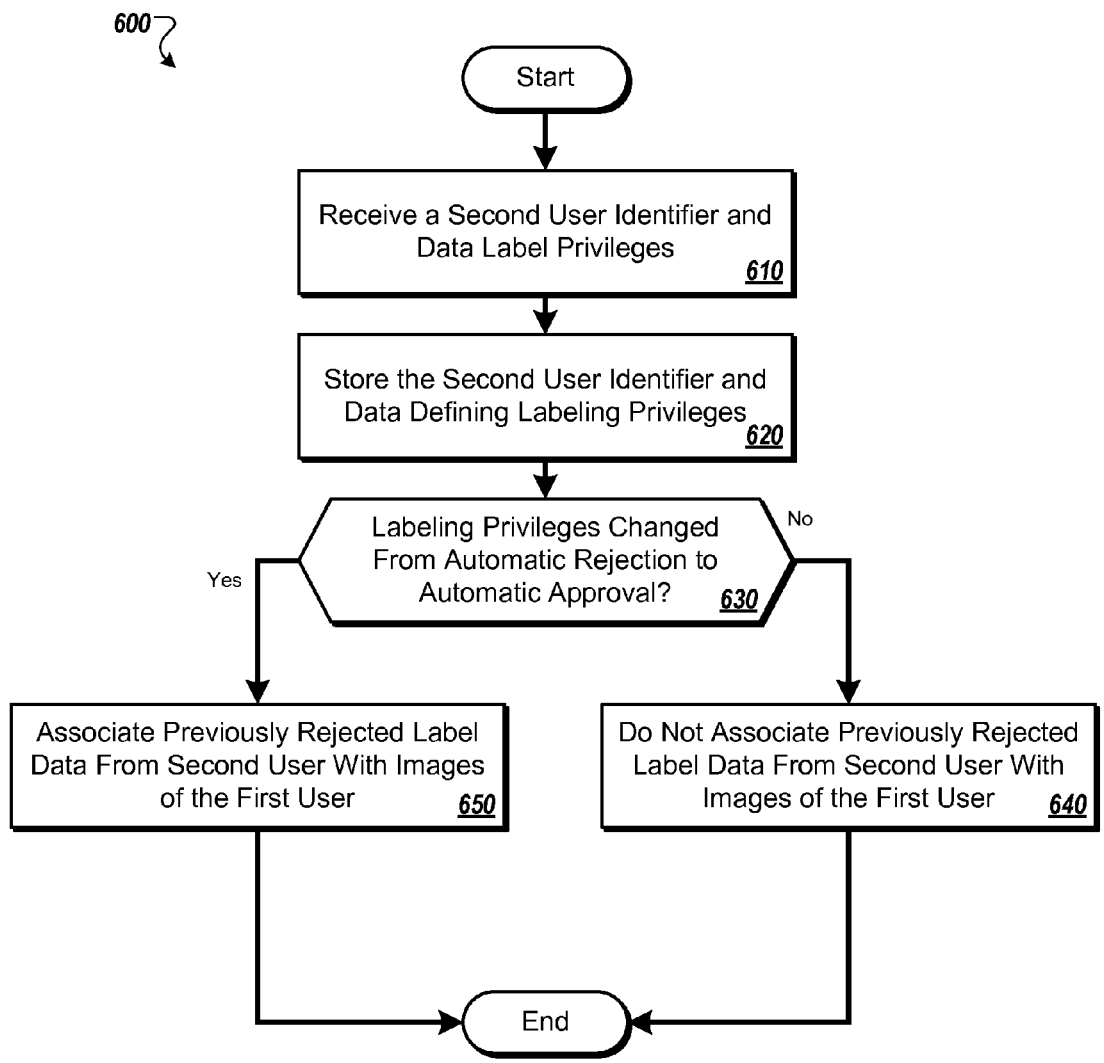
FIG. 6 is a flow diagram of an example process for updating face labels.

FIG. 6 is a flow diagram of an example process 600 for updating face labels. In some implementations, the process 600 may be performed by the data processing apparatus 108 of FIG. 1, or by the label processing module 220 of FIG. 2.

At step 610, a second user identifier and data labeling privileges for a second user identified by the second user identifier is received. For example, the user Channing 114 may re-categorize the user "X" 202 from the "reject" group 232 to the "accept" group.

At step 620, the second user identifier and the data defining labeling privileges for the second user identifier in the data defining labeling privileges associated with the first user identifier is stored. For example, the label processing module 220 may remove the identifier "UID$_x$" for the user "X" 202 from the "reject" group 232 and store the identifier in the "accept" group associated with the user Channing 114.

If at step 630, the labeling privileges for the second user identifier are determined not to have changed from an automatic rejection privilege to an automatic approval privilege, then at step 640, the label data is not associated with the image of the first user in the digital photograph. If, however, at step 630, the labeling privileges for the second user identifier are determined to have changed from an automatic rejection privilege to an automatic approval privilege, then at step 650 the label data is associated with the image of the first user in the digital photograph. For example, the user Channing 114 can move the user "X" 202 from the "reject" group 232 to the "accept" group, and in response to this action, the label processing module 220 may associate the previously rejected label 212 with the photograph 204.

The example implementations above are described in the context of digital photographs. The features of these implementations can also be applied to other content types, such as videos.

Additional features can also be implemented in conjunction with the features described above. For example, in some implementations, labels are visible on photographs before the approval is received. In these implementations, the labels are visible to other users. The data processing apparatus 108, however, does not link a visible but not approved label to an identity profile until the tag is approved. Additionally, the photograph does not appear on the profile of the tagged user until the tag is approved. This implementation facilitates the labeling of a user that does not yet have accounts in a social networking service. Upon obtaining an account, the user may then approve or disapprove the labels.

In some implementations, by default all users are initially categorized as "pending approval" so that their tags put into the "pending approval" status. Each individual user may then categorize other users into particular approval circles, e.g., "auto approve" or "auto reject" circles so that the labels the subsequently-categorized users submit are processed accordingly.

In some implementations, users can also delegate approval privileges based on one or more predefined relationships. For example, a particular user may designate any other user that is within the particular user's second degree network (e.g., a "friend of a friend") as belonging to the particular user's auto-approval circle. In this example, labels of the particular user submitted by the user's "friends" and "friends of the particular user's friends" are automatically approved.

In another implementation, a user may suspend (or, alternatively, enable) auto-approval, pending, and rejection operations. For example, a user may have specified that all labels for that user are to be reviewed by her before approval (i.e., all labels are initially pending approval). However, the user can temporarily change the status to "auto reject" for a predefined time period, e.g., during the time the user is on travel and will have limited access to the Internet. The status changed can also be operatively associated with a message that explains that a submitted label is rejected. For example, another user may attempt to label the particular user in a photograph. In response, he will receive a rejection notification, e.g., "Sorry, I'm on vacation and I am not available to review my labels, so I'm rejecting them for now. You can try again after I return next Monday."

In some implementations, the data processing apparatus 108 can suggest nametag labels based on, for example, user profile information, other labels for the subject in other photographs, and the like. The suggested labels for a particular user, in variations of this implementation, are either auto approved or placed in a pending status, as specified by the user. For example, a particular user may specify that suggested labels are automatically approved, or placed in a pending approval list for review of the photograph and the label by the particular user, or that the apparatus 108 will not suggest labels for the particular user.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 7:
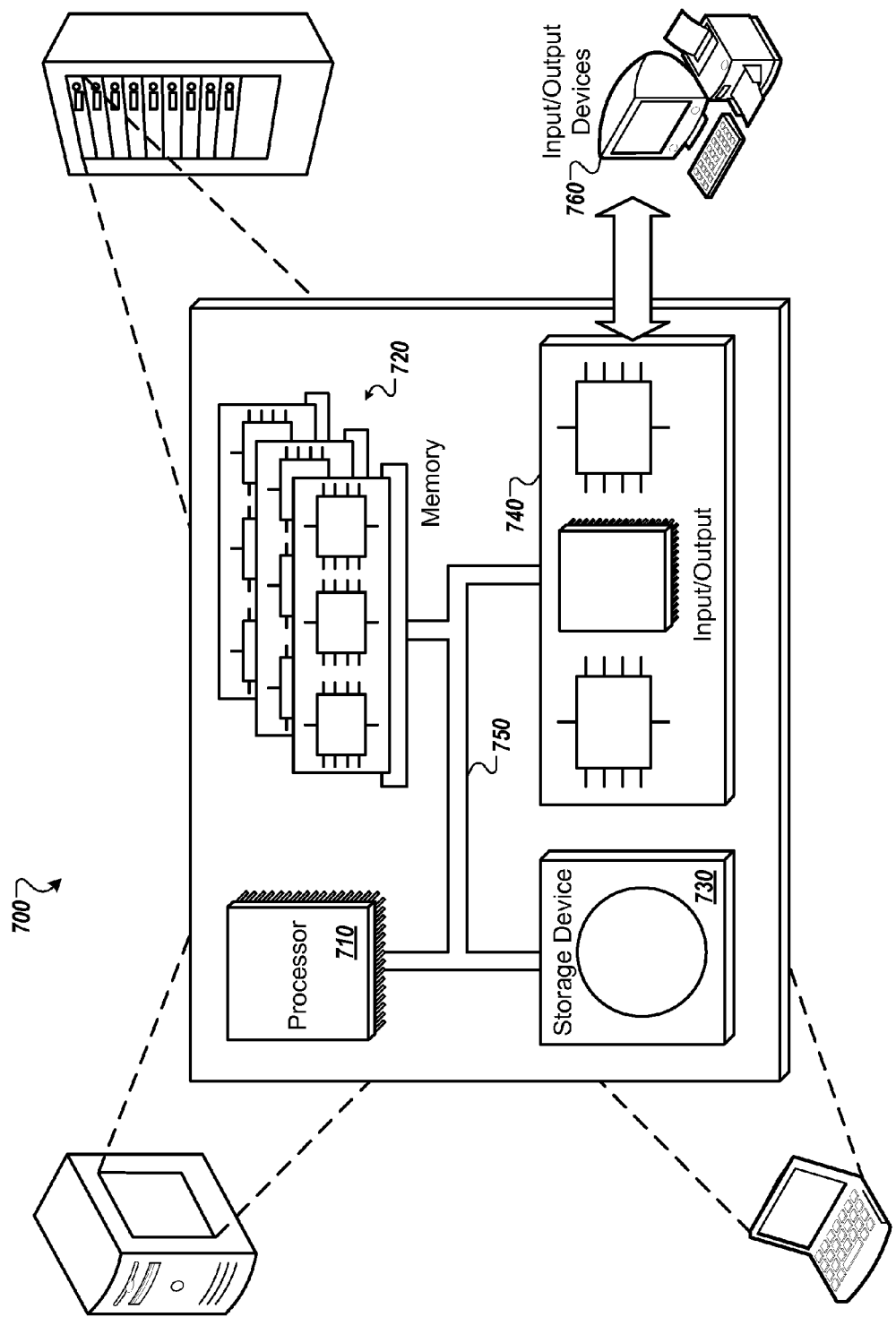
FIG. 7 a block diagram of an example programmable processing system.

An example of one such type of computer is shown in FIG. 7, which shows a block diagram of a programmable processing system 700 suitable for implementing apparatus or performing methods of various aspects of the subject matter described in this specification. The system 700 includes a processor 710, a random access memory (RAM) 720, a storage device 730, and an input/output (I/O) controller 740 coupled by a processor (CPU) bus 750. The system 700 can be preprogrammed, in ROM, for example, or it can be programmed (and reprogrammed) by loading a program from another source (for example, from a floppy disk, a CD-ROM, or another computer).

The storage device 730 suitable for storing executable computer programs, including programs embodying aspects of the subject matter described in this specification, and data including digital photographs, user identities, face area information, user relationships, affinity scores, quality scores, information that associates user identities with digital photographs, and other appropriate data.

The I/O controller 740 receives and transmits data (e.g., stills, pictures, movies, and animations for importing into a composition) in analog or digital form over communication links such as a serial link, local area network, wireless link, and parallel link.

Also coupled to the I/O controller 740 are output devices 760 which in various embodiments can include a display, a keyboard, a printer, and other input and output peripherals.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
receiving, at the data processing apparatus, label data defining a label that is to be associated with an image of a first user in a digital photograph, the first user identified by a first user identifier and the label data received from a user device associated with a submitting user identifier;
accessing, at the data processing apparatus, data defining labeling privileges associated with the first user identifier, the labeling privileges being for second users relative to the first user, the second users identified by respective second user identifiers, and the labeling privileges defining, for each second user, a labeling privilege for the second user to label an image of the first user in a digital photograph;
determining whether the submitting user identifier is included in the second user identifiers;
in response to determining that the submitting user identifier is included in the second user identifiers:
determining the labeling privilege defined for the second user identified by the submitting user identifier, the labeling privilege including an automatic rejection privilege; and
processing the label data according to the labeling privilege defined for the second user identified by the submitting user identifier, including:
rejecting the label data from association with the image of the first user in the digital photograph;
determining that the labeling privilege for the second user identified by the submitting user identifier changed from the automatic rejection privilege to an automatic approval privilege; and
associating the previously rejected label data received from a user device associated with the second user with the image of the first user in the digital photograph.

2. The method of claim 1, further comprising, in response to determining that the submitting user identifier is not included in the second user identifiers:
categorizing the label data as pending association with the image of the first user in the digital photograph;
providing a notification message addressed to an address associated with the first user identifier, the notification message specifying that the label data is pending association with the image of the first user in the digital photograph; and
associating the label data with the image of the first user in the digital photograph only in response to receiving an approval command in response to the notification message.

3. The method of claim 2, wherein the notification message includes the digital photograph and the label data.

4. The method of claim 1, wherein the automatic rejection privilege is associated with the first user identifier for a predefined time period.

5. The method of claim 1, further comprising:
receiving a request from a user device for the digital photograph; and
providing, in response to the request, the digital photograph and only label data that is associated with the digital photograph.

6. The method of claim 1, wherein the digital photograph is received from the user device associated with the submitting user identifier.

7. The method of claim 1, further comprising:
receiving, from a user device associated with the first user identifier, a second user identifier and data labeling privileges for the second user identified by the second user identifier; and
storing the second user identifier and the data defining labeling privileges for the second user identifier in the data defining labeling privileges associated with the first user identifier.

8. A non-transitory computer storage medium encoded with a computer program, the program comprising instructions that when executed by data processing apparatus cause the data processing apparatus to perform operations comprising:
receiving, at the data processing apparatus, label data defining a label that is to be associated with an image of a first user in a digital photograph, the first user identified by a first user identifier and the label data received from a user device associated with a submitting user identifier;
accessing, at the data processing apparatus, data defining labeling privileges associated with the first user identifier, the labeling privileges being for second users relative to the first user, the second users identified by respective second user identifiers, and the labeling privileges defining, for each second user, a labeling privilege for the second user to label an image of the first user in a digital photograph;
determining whether the submitting user identifier is included in the second user identifiers;
in response to determining that the submitting user identifier is included in the second user identifiers:
determining the labeling privilege defined for the second user identified by the submitting user identifier, the labeling privilege including one of an automatic approval privilege and an automatic rejection privilege; and
processing the label data according to the labeling privilege defined for the second user identified by the submitting user identifier, including:
associating the label data with the image of the first user in the digital photograph if the labeling privilege defined for the second user identified by the submitting user identifier is the automatic approval privilege; and
rejecting the label data from association with the image of the first user in the digital photograph if the labeling privilege defined for the second user identified by the submitting user identifier is the automatic rejection privilege;
determining that the labeling privilege for the second user identified by the submitting user identifier changed from the automatic rejection privilege to the automatic approval privilege; and
associating the previously rejected label data received from a user device associated with the second user with the image of the first user.

9. The computer storage medium of claim 8, wherein the instructions cause the data processing apparatus to perform operations further comprising, in response to determining that the submitting user identifier is not included in the second user identifiers:
categorizing the label data as pending association with the image of the first user in the digital photograph;
providing a notification message addressed to an address associated with the first user identifier, the notification message specifying that the label data is pending association with the image of the first user in the digital photograph; and
associating the label data with the image of the first user in the digital photograph only in response to receiving an approval command in response to the notification message.

10. The computer storage medium of claim 8, wherein the instructions cause the data processing apparatus to perform operations further comprising suggesting a label for the first user based on first user profile information or other labels for the first user in other digital photographs, wherein the suggested label is assigned the automatic approval privilege.

11. The computer storage medium of claim 8, wherein the instructions cause the data processing apparatus to perform operations further comprising:
receiving a request from a user device for the digital photograph; and
providing, in response to the request, the digital photograph and only label data that is associated with the digital photograph.

12. The computer storage medium of claim 8, wherein the digital photograph is received from the user device associated with the submitting user identifier.

13. The computer storage medium of claim 8, and wherein the instructions cause the data processing apparatus to perform operations further comprising:
receiving, from a user device associated with the first user identifier, a second user identifier and data labeling privileges for the second user identified by the second user identifier; and
storing the second user identifier and the data defining labeling privileges for the second user identifier in the data defining labeling privileges associated with the first user identifier.

14. A system, comprising:
a data processing apparatus; and
a non-transitory computer storage medium encoded with a computer program, the program comprising instructions that when executed by the data processing apparatus cause the data processing apparatus to perform operations comprising:
receiving, at the data processing apparatus, label data defining a label that is to be associated with an image of a first user in a digital photograph, the first user identified by a first user identifier and the label data received from a user device associated with a submitting user identifier;
accessing, at the data processing apparatus, data defining labeling privileges associated with the first user identifier, the labeling privileges being for second users relative to the first user, the second users identified by respective second user identifiers, and the labeling privileges defining, for each second user, a labeling privilege for the second user to label an image of the first user in a digital photograph;
determining whether the submitting user identifier is included in the second user identifiers;
in response to determining that the submitting user identifier is included in the second user identifiers:
determining the labeling privilege defined for the second user identified by the submitting user identifier, the labeling privilege including an automatic rejection privilege;

rejecting the label data from association with the image of the first user in the digital photograph based on the automatic rejection privilege defined for the second user identified by the submitting user identifier;

determining that the labeling privilege for the second user identified by the submitting user identifier changed from the automatic rejection privilege to an automatic approval privilege; and associating the previously rejected label data received from the user device associated with the second user with the image of the first user in the digital photograph.

15. The system of claim 14, wherein the instructions cause the data processing apparatus to perform operations further comprising, in response to determining that the submitting user identifier is not included in the second user identifiers:

categorizing the label data as pending association with the image of the first user in the digital photograph;

providing a notification message addressed to an address associated with the first user identifier, the notification message specifying that the label data is pending association with the image of the first user in the digital photograph; and associating the label data with the image of the first user in the digital photograph only in response to receiving an approval command in response to the notification message.

16. The system of claim 14, wherein the instructions cause the data processing apparatus to perform operations further comprising suggesting a label for the first user based on first user profile information or other labels for the first user in other digital photographs, wherein the suggested label is assigned the automatic approval privilege.

17. The system of claim 14, wherein the instructions cause the data processing apparatus to perform operations further comprising:

receiving a request from a user device for the digital photograph; and providing, in response to the request, the digital photograph and only label data that is associated with the digital photograph.

18. The system of claim 14, wherein the instructions cause the data processing apparatus to perform operations further comprising:

receiving, from a user device associated with the first user identifier, a second user identifier and data labeling privileges for the second user identified by the second user identifier; and storing the second user identifier and the data defining labeling privileges for the second user identifier in the data defining labeling privileges associated with the first user identifier.

19. The method of claim 1 further comprising determining that the submitting user identifier is associated with the automatic approval privilege based on one or more predefined relationships with the submitting user designated by the first user, wherein the one or more predefined relationships includes the submitting user being within the first user's network of a specified degree.

20. The method of claim 1 further comprising suggesting a label for the first user based on first user profile information or other labels for the first user in other digital photographs, wherein the suggested label is assigned the automatic approval privilege.

21. The method of claim 2 wherein, after providing the notification message and before receiving a response to the notification message, the label data is temporarily associated with the image of the first user in the digital photograph.

* * * * *